(12) United States Patent
Segner

(10) Patent No.: US 10,315,946 B2
(45) Date of Patent: Jun. 11, 2019

(54) DEVICE AND METHOD FOR FORMING GLASS BODIES

(71) Applicant: SCHOTT Schweiz AG, St. Gallen (CH)

(72) Inventor: Johannes Segner, St. Gallen (CH)

(73) Assignee: SCHOTT SCHWEIZ AG, St. Gallen (CH)

( * ) Notice: Subject to any disclaimer, the term of this patent is extended or adjusted under 35 U.S.C. 154(b) by 247 days.

(21) Appl. No.: 15/050,905

(22) Filed: Feb. 23, 2016

(65) Prior Publication Data

US 2016/0244354 A1 Aug. 25, 2016

(30) Foreign Application Priority Data

Feb. 23, 2015 (DE) .................. 10 2015 002 456

(51) Int. Cl.
*C03B 23/09* (2006.01)
*C03B 23/045* (2006.01)

(52) U.S. Cl.
CPC .......... *C03B 23/045* (2013.01); *C03B 23/094* (2013.01); *C03B 23/095* (2013.01); *C03B 23/099* (2013.01)

(58) Field of Classification Search
CPC ..... C03B 23/09; C03B 23/092; C03B 23/095; C03B 23/099; C03B 37/01251; C03B 37/15; C03B 2215/70
USPC ................... 65/243–252, 295, 296, 297, 299
See application file for complete search history.

(56) References Cited

U.S. PATENT DOCUMENTS

| | | | | |
|---|---|---|---|---|
| 1,199,483 A | * | 9/1916 | Hooge et al. | C03B 23/095 65/109 |
| 1,859,011 A | * | 5/1932 | Wales | C03B 23/097 65/110 |
| 2,596,899 A | | 5/1948 | Kahle | |
| 2,446,000 A | * | 7/1948 | Eisler | C03B 23/092 65/174 |
| 2,469,681 A | * | 5/1949 | Coby | B29C 49/68 432/124 |
| 2,818,683 A | | 1/1958 | Nieman et al. | |
| 2,935,819 A | | 5/1960 | Dichter | |
| 3,083,813 A | * | 4/1963 | Lusher | C03B 23/0093 198/803.12 |
| 3,211,541 A | * | 10/1965 | Leonard | C03B 23/095 65/156 |
| 3,257,186 A | * | 6/1966 | Zauner | C03B 23/095 65/104 |
| 3,368,588 A | * | 2/1968 | Meyer | C03B 23/09 138/178 |

(Continued)

FOREIGN PATENT DOCUMENTS

DE 102009031689 A1 12/2010
EP 1022765 A1 7/2000

*Primary Examiner* — Cynthia Szewczyk
(74) *Attorney, Agent, or Firm* — Ohlandt, Greeley, Ruggiero & Perle, L.L.P.

(57) ABSTRACT

A device for the shaping of glass bodies, in particular of pharmaceutical vials, comprises a clamping chuck for holding a glass body, a rotary drive for driving the clamping chuck rotatingly, further at least one heat source for heating a glass body held within the clamping chuck, and further a controller which is coupled to the rotary drive so that the clamping chuck can be driven at variable rotational speed.

13 Claims, 2 Drawing Sheets

(56) References Cited

U.S. PATENT DOCUMENTS

| | | | |
|---|---|---|---|
| 3,736,118 A * | 5/1973 | Heflich et al. | C03B 23/097 374/E5.003 |
| 4,330,317 A | 5/1982 | Vertova | |
| 4,378,989 A | 4/1983 | La Fiandra et al. | |
| 2012/0060558 A1 * | 3/2012 | Haselhorst | C03B 23/092 65/29.21 |
| 2013/0108811 A1 * | 5/2013 | Wada | C03B 23/099 428/34.4 |

* cited by examiner

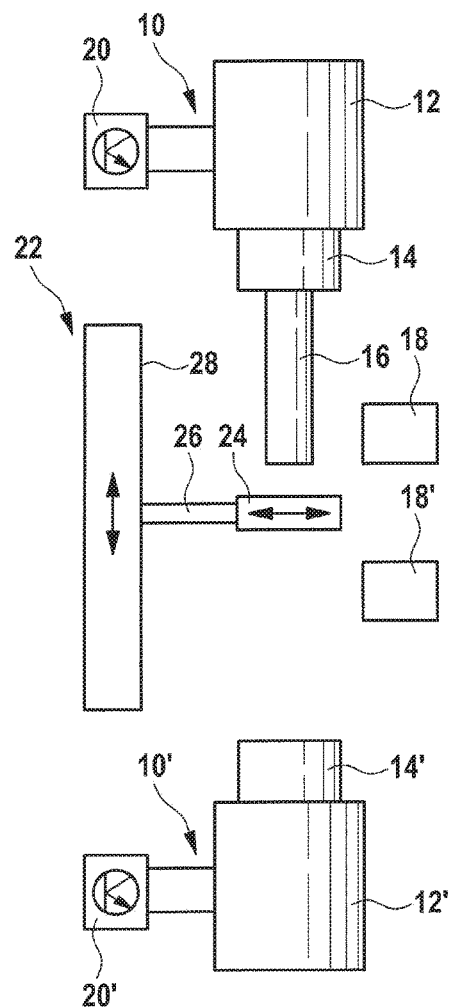
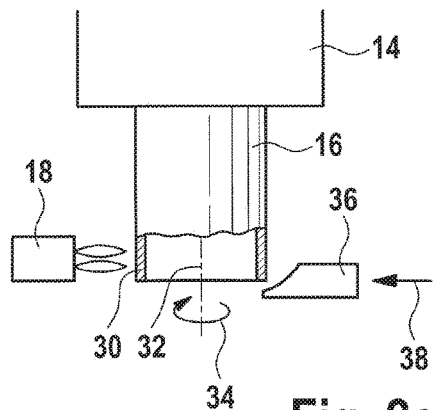
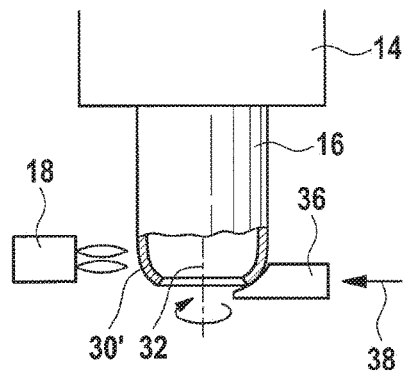
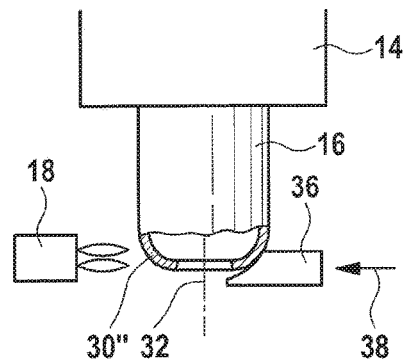
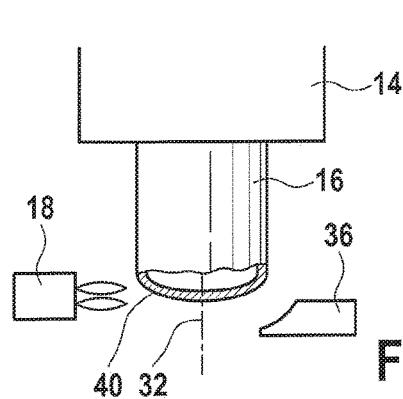
Fig. 1
Fig. 2a
Fig. 2b
Fig. 2c
Fig. 2d

DEVICE AND METHOD FOR FORMING GLASS BODIES

CROSS REFERENCES TO RELATED APPLICATIONS

This application claims priority from German patent application 102015002456.0, filed on Feb. 23, 2015. The entire content of this priority application is incorporated herein by reference.

BACKGROUND OF THE INVENTION

The invention relates to a device for the forming of glass bodies, in particular of pharmaceutical vials, comprising a clamping chuck for receiving a glass body and a rotary drive for driving the clamping chuck rotatingly, and further comprising a heat source for heating the glass body.

The invention further relates to a method of forming glass bodies, in particular pharmaceutical vials, in particular made of borosilicate glass, wherein a glass body is driven rotatingly, is at least locally heated to its softening temperature, preferably to a viscosity in the range of $10^3$ to $10^5$ dPas, and subsequently formed.

In the manufacture of pharmaceutical flasks (vials) individual parts are separated from glass tubes for forming pharmaceutical vials thereof.

Also when a glass forming machine that is used in this regard comprises several stations, still all these stations run with a common rotational speed which is usually between 2 and 600 rpm which is fixed for all phases of the treatment.

Such a glass forming machine is for instance known from U.S. Pat. No. 4,330,317.

SUMMARY OF THE INVENTION

In view of this it is a first object of the invention to disclose a device and a method for the manufacture of glass bodies, in particular pharmaceutical vials, in a simple and cost-effective way.

It is a second object of the invention to disclose a device and a method for the manufacture of pharmaceutical vials, wherein the process temperatures shall be kept as low as possible.

It is a third object of the invention to disclose a device and a meth the manufacture of pharmaceutical vials, having low evaporation losses during hot-forming thereof.

It is a forth object of the invention to disclose a device and a method for the manufacture of pharmaceutical vials at high precision.

According to one aspect of the invention these and other objects are solved by a device for the shaping of glass bodies, in particular pharmaceutical vials, comprising a clamping chuck for receiving a glass body and a rotary drive for driving the clamping chuck rotatingly, comprising a heat source for heating the glass body, and further comprising a control which is coupled to the rotary drive so that the clamping chuck can be driven at varying speed.

According to the invention this object is fully solved.

Since the rotational speed can be adjusted and varied as desired, for each glass treating phase an optimal speed can be utilized. In this way in particular at higher rotational speeds of more than 1000 rpm a reduced temperature can be utilized, whereby the evaporation losses are reduced.

Preferably the rotational speed can be adjusted to more than 600 rpm, preferably to at least 1000 rpm, particularly preferred to at least 2000 rpm, mostly preferred to at least 10000 rpm.

At such high rotational speeds the forming temperature, which usually is in the range of 1100 to 1200° C., can be considerably reduced. Thus by increasing the rotational speed from 600 rpm to 1000 rpm a reduction in the forming temperature of about 30 K results, while further increases, e.g. up to 2000 rpm, 10000 rpm or even 25000 rpm lead to considerably temperature reductions (about 200 K at 25000 rpm).

For instance this allows for a considerable reduction of the laser power in a laser-assisted deforming process with glass regions curved to the outside (beyond the radius of the green product). Thereby the profitability of a laser-assisted deformation is improved, since a smaller number of laser sources or laser sources with a smaller power are necessary. By the reduced working temperature the change of the glass composition by evaporation of glass constituents, such as borates or sodium containing components, is considerably reduced. Thereby the maintaining of chemical glass characteristics is improved and simultaneously the contamination of glass bodies with undesired deposits is avoided.

The at least one heat source may be configured as a burner, a laser, a hot-air nozzle, a resistance-heated gas heater or as an infrared radiator which preferably at least partially surrounds the glass body, in particular as a particle-free heat source.

Depending on the rotational speed and the application in this way more cost-effective heating devices, such as resistance-heated gas heaters, can be utilized which work with a gas temperature of 500° C. to 800° C. and which substantially do not emit any particles, by contrast to prior art burners. In addition hot-air nozzles or infrared radiators can be utilized which preferably at least partially surround the glass body.

According to a further development of the invention in addition a shaped body is provided which can be advanced against the rotatingly driven glass body for assisting a bottom forming, wherein the glass body is driven at a reduced rotational speed of less than 300 rpm.

In this way the procedure during the bottom forming of a vial is simplified. According to the prior art a partial region of a glass tube is heated with a burner and the two tube ends are torn apart so that a necking results. After contact of the inner surfaces of the tube within the necking zone the tube is separated at the necking, i.e. the glass strand tears off by itself. The glass bottom at the tube sections which have been separated, now forms by the glass surface tension while during the whole forming there is heated for assistance. For the machine design this means that in addition to the rotating motion a motion in the direction of the rotational axis must be realized.

According to the invention this process is now particularly simplified. A tube section is heated at one end to the forming temperature. By means of a shaping part acting from outside a part of the glass is pressed towards the axis of rotation, while the rotational speed is reduced to a rotational speed of less than 300 rpm which is lower than the rotational speed during the heating phase. During further heating and slow rotation at the glass body first an open bottom forms which thereafter closes by itself by the surface tension of the glass.

According to a further configuration of the invention the device comprises a plurality of processing stations which each have a clamping chuck for receiving a glass body, wherein glass bodies can be transferred between selected processing stations, and wherein the individual processing stations can each be controlled with respect to the rotational speed.

In this way the glass forming processes can be considerably simplified and optimally adapted to the given conditions.

Preferably herein the clamping chucks may be stopped for transferring glass bodies between selected processing stations, to allow for a transfer of the glass bodies while being at rest.

This allows for a more simplified handling and a reduction of failures.

According to a further development of the invention the heat source is configured for selectively heating the glass body, and the clamping chuck can be positioned in axial direction with respect to the heat source.

In this way a zone-selective heating can be performed (for instance a laser heating (laser beam forming)). Herein the rotational speed can be used as an additional parameter. Since the glass body to be formed can be positioned by means of the clamping chuck in an axial direction, there are two additional forming parameters, namely the rotational speed and thus the centrifugal force acting on the workpiece on the one hand, and the relative position to the forming tools on the other hand.

In this way a considerably more effective forming at lower forming temperatures and a simplified processing can be reached.

To allow for high rotational speeds, the bearing for supporting the clamping chuck can be designed with magnetic bearings, whereby particularly high rotational speeds and an almost wear-free operation is made possible.

In addition the invention is solved by a method of forming glass bodies, in particular pharmaceutical vials, in particular of borosilicate glass, wherein the glass body is driven rotatingly, is at least locally heated up to its softening temperature, preferably to a viscosity in the range of $10^3$ to $10^5$ dPas, and is formed thereafter, wherein the rotational speed during the heating and/or forming process is varied.

As mentioned above by varying the rotational speed the conditions during heating and forming can be optimally adjusted.

For forming the bottom of a glass vial preferably in the beginning a glass tube is driven rotatingly and is heated, subsequently a shaping body is advanced from the outside at one end of the glass tube at reduced rotational speed which is smaller than 300 rpm, preferably smaller than 100 rpm, until the glass tube closes and forms a bottom.

As already mentioned above a considerably simplified bottom forming of a glass vial can be reached by this amended forming process.

It has been found that the time that is necessary for the complete forming of the body decreases with decreasing rotational speed. Rotational speeds of less than 100 rpm have been found to be particularly advantageous. By this method of bottom forming without glass tube separation the separating movement, and consequently the glass handling within the device and the risk of glass damage is omitted. In addition the processing step of the tube opening at the tube part is omitted which after the bottom separating is for instance formed to the upper rim of a vial. Also the forming of the body after the tearing apart of the tube segments by a bottom-forming-matrix is omitted.

According to the invention the bottom now is formed instead by means of the shaping body, which may be configured as a rolling tool, engaging from the rim, towards the center of the glass tube.

According to a further development of the invention after the forming of the body the rotational speed is varied, i.e. in most cases is increased, until an even material thickness appears.

According to a further development of the invention for forming a bypass the glass tube at a partial region of its surface is locally heated while being at rest or at a rotational speed of less than 100 rpm, preferably of less than 50 rpm, until a viscosity in the range of about $10^3$ to $10^5$ dPas is reached, and thereafter the rotational speed is increased, until in the heated region a symmetrical shaping to the outside results, to thereby form a bypass.

By a short acceleration to a higher rotational speed the heated region is exposed to high centrifugal forces, whereby a symmetrical arching can be independently formed, without an inner pressure being necessary therefor. However, the process of arching can be assisted by an additional inner pressure.

Herein preferably the glass in the forming region is heated up to a viscosity of about $10^3$ to $10^5$ dPas, preferably to about $10^4$ dPas and then starting from a slow rotational speed or from a stop is increased to a rotational speed of at least 1000 rpm, preferably of more than 2000 rpm, particularly preferred to more than 5000 rpm, for forming the bypass.

Herein the increase in rotational speed is generated in a considerably small time, so that an acceleration of at least 200 $1/\min^2$, preferably of at least 500 $1/\min^2$, particularly preferred of at least 1000 $1/\min^2$ results.

It should be understood that the afore-mentioned features and the features of the invention to be explained hereinafter cannot only be used in the given combinations, but also in different combinations or independently without departing from the scope of the invention.

BRIEF DESCRIPTION OF THE DRAWINGS

Further features and advantages of the invention can be taken from the subsequent description of preferred embodiments with reference to the drawings. In the drawings show:

FIG. 1 a strongly simplified representation of a glass forming machine comprising two processing stations;

FIGS. 2*a-d* a schematic representation of the different phases of a bottom forming for a pharmaceutical vial;

DESCRIPTION OF PREFERRED EMBODIMENTS

Figure 4:
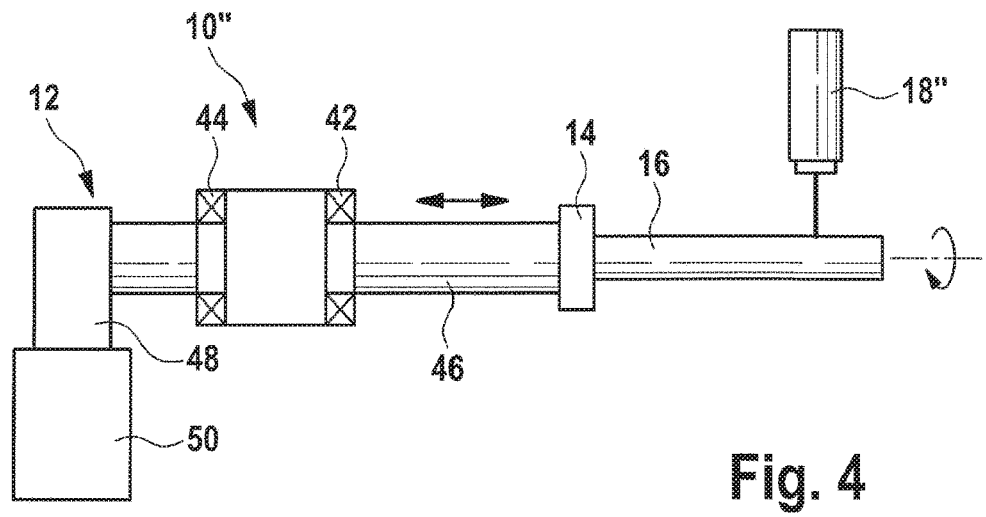
FIG. 4 a strongly simplified representation of a further device for glass forming, wherein in addition the position of the glass tube with respect to a heat source can be adjusted.

In FIG. 1 a device according to the invention for the forming of glass bodies is shown strongly simplified.

A first station 10 comprises a rotary drive 12 which can be continuously adjusted to a variable rotational speed between 0 and 15000 rpm by means of a controller 20. A clamping chuck 14 is driven by the rotary drive 12 and allows for a clamping of different glass bodies 16 configured as glass tubes. In addition at least one heating device 18 is provided. This can for instance be a burner, a laser, a hot-air nozzle, a resistance-heated gas heater or an infrared radiator, depending on the desired application purpose.

The device further comprises a second station for the glass forming which is configured identical and denoted with 10'. Again a clamping chuck 14' can be driven with variable speed by means of a rotary drive 12'. Preferably the rotational speed can be continuously adjusted in the range of 0 to 15000 rpm by means of the controller 20'.

Depending on the bearings (not shown) that are utilized, also higher rotational speeds may be possible If for instance magnetic bearings are utilized, very high rotational speeds of for instance 25000 rpm can be reached practically wear-free.

For transferring glass bodies 16 between the stations 10, 10' a handling device 22 is provided which here is only depicted exemplarily. The handling device 22 comprises a gripper 24 whereby a glass body 16 can be gripped from outside and can be held at an arm 26. The arm 26 can be translated along a guide 28 so that by means of the handling device 22 glass bodies 16 can be inserted into the clamping chuck 14 of the first station 10, can be removed therefrom and can also be transferred to the clamping chuck 14' of the second station 10'.

Of course the device may comprise further stations. Herein only two stations 10, 10' and an assigned handling device 22 are shown exemplarily. For a transfer between the stations 10, 10' the rotational speed can be lowered to zero so that the risk of a damage of the glass bodies during the transfer is considerably reduced.

In the following with reference to FIGS. 2a to 2d the different stations are further explained with respect to a bottom forming of a pharmaceutical vial according to the invention.

Pharmaceutical flasks (also commonly designated as vials) must fulfill high requirements with respect to the quality of the glass bodies and in particular also with respect to the freeness of residuals. Pharmaceutical vials usually are prepared from borosilicate glass. During the forming of a borosilicate glass at the normal forming temperatures which usually are between about 1100° C. and 1200° C., depending from the temperature and time of heating, evaporation losses in particular in the form of boron oxide or sodium may result which affect the quality of the pharmaceutical vials adversely and also may lead to precipitates on the inner surfaces of the glass vials which is also unfavorable. These problems with the bottom forming according to the invention can partially be avoided or at least reduced. Also in total the course of processing is simplified.

According to the bottom forming of pharmaceutical vials according to the invention it is acted as follows:

In the beginning a glass tube 16 is heated at its outer end 30 by means of a burner 18 so that the glass end is adjusted to a viscosity of about $10^3$ to $10^5$, preferably to about $10^4$ dPas. Depending on the glass type this temperature $T_4$ is about 1100 to 1200° C. Now the rotational speed is reduced from initially for instance 600 rpm to for instance about 50 to 100 rpm.

During continuous heating and slow rotation of the glass tube 16 now a shaping body 36, which may be configured as shaping roll, is advanced against the end of the glass tube 16, as depicted in FIG. 2a by means of the arrow 38. The end of the glass tube is deformed towards the rotational axis 32 by the shaping body 36, as depicted in FIG. 2b. A tapering at the end 30' of the glass tube 16 results. During further slow rotation of the glass tube 16 and further heating the shaping body 36 is further advanced towards the direction of the axis of rotation 32, as depicted in FIG. 2c. Finally the end of the glass tube 16 by means of the surface tension closes so that a closed bottom 40 results, as depicted in FIG. 2d. The shaping body 36 may now be retracted.

Now the bottom 40 can be evenly formed by a further variation of the rotational speed, usually by an increase in the rotational speed. At higher rotational speed the centrifugal forces increase so that more material is urged to the outside, while at lower rotational speed more material accumulates in the center. In this way by a suitable adjustment of the rotational speed a flat forming of the bottom with even material thickness can be effected.

Figure 3A:
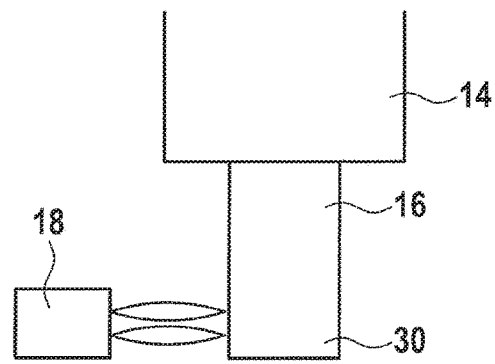
FIGS. 3*a,b* a schematic representation of the different phases during the forming of a bypass.
Figure 3B:
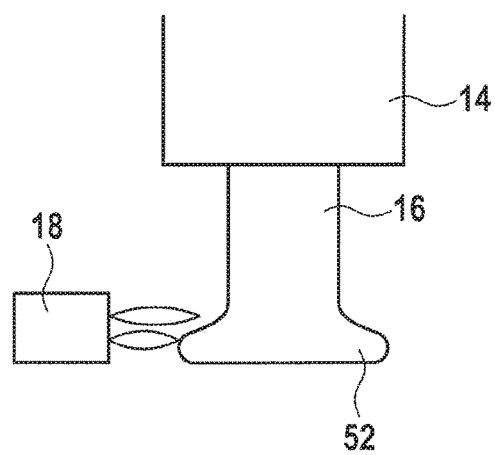

In FIGS. 3a and b a further variant of the method according to the invention is shown.

Herein a so-called bypass is formed. This is configured as an extension at the end or in the middle of a glass tube. Such a bypass is necessary for instance, when two different substances shall be stored initially separated from each other and thereafter shall be mixed for usage. Herein the bypass serves as a mixing room of a suitably designed syringe.

For generating such a bypass initially a glass tube at its end is heated by means of a burner 18 to its softening temperature so that for instance a viscosity of about $10^4$ dPas ensues. Now instantly the rotational speed from initially 600 rpm by way of example is increased to 5000 rpm, which by way of example may be performed within one minute or even faster. By the fast increase in the rotational speed the centrifugal forces increase drastically so that a symmetrical arching in the softened region results so that in this way a bypass 52 is formed at the outer end.

After the desired forming of the bypass the heating is shut off, and the rotational speed is again reduced to zero.

In FIG. 4 a further development of the device for glass forming according to the invention is shown schematically and depicted in total with the numeral 10". A clamping chuck 14 is provided at the outer end of a shaft 46 which is held adjustably in axial direction by means of two bearings 42, 44 which preferably are configured as magnetic bearings. The shaft 46 at its end is driven by a motor 50 by means of a gear 48. By the axial adjusting possibility of the clamping chuck 14 and of the glass body 16 received therein, the latter in combination with the assigned heating device 18", which for instance may be configured as a laser, can be locally treated in a particular way, wherein as parameters, in addition to the heating by means of the laser, the respective axial position of the glass body 16 and its rotational speed are included.

In total in this way the possibility of variation during the forming of the class body 16 is particularly improved.

What is claimed is:

1. A device for the forming of glass bodies, comprising a plurality of processing stations, each processing station comprising:
    a clamping chuck for receiving a glass body;
    a rotary drive for driving said clamping chuck rotatingly at a rotational speed;
    a controller being coupled to said rotary drive allowing to control said rotational speed of said rotary drive continuously between a minimum value and a maximum value so that said rotational speed of said rotary drive of said plurality of processing stations are controlled independently from each other; and
    at least one handling device configured to remove the glass body from one of said plurality of processing stations that performs a first processing step on the glass body and to transfer the glass body to a different one of said plurality of processing stations that performs a different processing step on the glass body,
    wherein at least one of said plurality of processing stations further comprises at least one heat source for heating the glass body.

2. The device of claim 1, wherein said handling device is configured for transferring glass bodies between said processing station while said clamping chucks are driven rotatingly or are at rest.

3. The device of claim 1, wherein said heat source is arranged for selectively heating said glass body, and wherein said clamping chuck and said heat source can be positioned in an axial direction with respect to each other.

4. The device of claim 1, wherein at least one heat source is configured as a heat source selected from the group consisting of a burner, a laser, a hot-air nozzle, a resistance-heated gas heater, and an infrared radiator.

5. The device of claim 4, wherein said heat source is a substantially particle-free heat source.

6. The device of claim 1, wherein the controller controls said rotational speed of said rotary drive up to a maximum value of at least 10000 rpm.

7. The device of claim 1, which further comprising a shaping body being arranged for advancing against said glass body in a radial direction thereof to assist a bottom forming.

8. The device of claim 1, wherein for transferring glass bodies between selected processing stations the clamping chucks can be stopped to allow for a transfer of the glass bodies while being at a standstill.

9. The device of claim 1, further comprising magnetic bearings for holding said clamping chuck rotatingly.

10. A device for the forming of glass bodies, comprising:
a clamping chuck for receiving a glass body;
a rotary drive for driving said clamping chuck rotatingly at a rotational speed;
a controller being coupled to said rotary drive allowing to control said rotational speed of said rotary drive continuously between a minimum value and a maximum value;
a shaping body being arranged to advance against the glass body in a radial direction to close a bottom of the glass body; and
at least one heat source for selectively heating the glass body received within said clamping chuck,
wherein said clamping chuck and said heat source are configured for being positioned in an axial direction with respect to each other.

11. The device of claim 10, wherein the controller controls said rotational speed of said rotary drive up to a maximum value of at least 10000 rpm.

12. A device for the forming of a glass body, comprising:
a plurality of processing stations, each processing station comprising a clamping chuck for receiving the glass body and a rotary drive for driving said clamping chuck rotatingly at a rotational speed;
a controller coupled to said rotary drive of all of said plurality of processing stations, said controller being configured to control the rotational speed of each rotary drive continuously between a minimum value and a maximum value; and
at least one handling device configured to remove the glass body from one of said plurality of processing stations and to transfer the glass body to a different one of said plurality of processing stations,
wherein said plurality of processing stations comprises at least two processing stations that further comprise at least one heat source for heating the glass body,
wherein the rotational speed of said rotary drive of said at least two processing stations is controlled independently from each other, and
wherein said controller controls said clamping chucks to a standstill and said at least one handling device is configured to remove and transfer the glass body between said plurality of processing stations only when said clamping chucks are at said standstill.

13. A device for the forming of glass bodies, comprising:
a clamping chuck for receiving a glass body;
a rotary drive for driving said clamping chuck rotatingly at a rotational speed;
a heat source for selectively heating the glass body received within said clamping chuck;
a shaping body being arranged to advance against the glass body in a radial direction to from a closed bottom on the glass body and to retract from the glass body after closing said closed bottom; and
a controller being coupled to said rotary drive and said shaping body, said controller being configured to increase said rotational speed of said rotary drive after retraction of said shaping body from said closed bottom so that said closed is a flat bottom with even material thickness.

* * * * *